(12) United States Patent
Chen et al.

(10) Patent No.: US 8,156,267 B2
(45) Date of Patent: Apr. 10, 2012

(54) SWITCHING APPARATUS AND DISPLAYING SYSTEM

(75) Inventors: Chien-Chou Chen, Chung Ho (TW); Yu-Jen Chen, Chung Ho (TW)

(73) Assignee: AmTRAN Technology Co., Ltd, Chung Ho, Taipei County (TW)

( * ) Notice: Subject to any disclaimer, the term of this patent is extended or adjusted under 35 U.S.C. 154(b) by 289 days.

(21) Appl. No.: 12/538,548

(22) Filed: Aug. 10, 2009

(65) Prior Publication Data
US 2010/0064076 A1 Mar. 11, 2010

(30) Foreign Application Priority Data
Sep. 5, 2008 (TW) .............................. 97134170 A

(51) Int. Cl.
G06F 13/12 (2006.01)
G06F 13/38 (2006.01)

(52) U.S. Cl. ............................................ 710/63; 345/5

(58) Field of Classification Search .................. None
See application file for complete search history.

(56) References Cited

U.S. PATENT DOCUMENTS 6,532,512 B1 *  3/2003  Torii et al. ..................... 710/316
7,603,498 B2 * 10/2009  Bishnoi et al. ................... 710/62
2004/0015980 A1 *  1/2004  Rowen et al. ................. 719/310
2004/0164924 A1 *  8/2004  Boger ............................ 345/3.1
2006/0123182 A1 *  6/2006  Sandulescu et al. .......... 710/316
2006/0125783 A1 *  6/2006  Hsieh et al. .................... 345/156
2010/0077126 A1 *  3/2010  Huang et al. .................. 710/316

FOREIGN PATENT DOCUMENTS

CN    1380615 A    11/2002
CN    1175362 C    11/2004

* cited by examiner

Primary Examiner — Elias Mamo
(74) Attorney, Agent, or Firm — Winston Hsu; Scott Margo

(57) ABSTRACT

The present invention provides a switching apparatus, which includes at least one first USB hub, one second USB hub and a controller. The first USB hub includes at least one first USB port for connecting N image input apparatus respectively; N is a positive integer. The second USB hub includes at least one second USB port for connecting M peripheral apparatus respectively; M is a positive integer. The controller is connected to the first USB hub and the second USB hub, for selecting at least one target image input apparatus from the N image input apparatus, and controlling the at least one target image input apparatus to communicate with at least one of the peripheral apparatuses.

26 Claims, 5 Drawing Sheets

SWITCHING APPARATUS AND DISPLAYING SYSTEM

BACKGROUND OF THE INVENTION

1. Field of the Invention

The present invention relates to a switching apparatus and a displaying system, and more particularly, the switching apparatus and displaying system of the invention are able to control a plurality of peripheral apparatuses to communicate with a plurality of image input apparatuses.

2. Description of the Prior Art

Along with the fast development of the electron and information techniques, all kinds of data processing equipment are already flooded in the modern life such as computers, videos and music broadcast apparatuses, motion communication apparatuses, game machines, screens, televisions, projectors, and so on, which have become indispensable means for modern people in their work, life, and entertainment.

In addition, all kinds of peripheral apparatuses are also massively developed and launched. With these peripheral apparatuses, a user may apply the fore-mentioned data processing equipment more effectively and variously. For example, a user may operate the data processing equipment via an input apparatus such as a keyboard, a mouse, etc.; s/he may carry on the data storage and transmission via a storage apparatus such as a flash drive, a CO-ROM drive, etc.; and s/he may output the data such as a document, a pattern, on via an output apparatus such as a printer, a fax machine, etc.

In the past, in order to connect these peripheral apparatuses with the data processing equipment, the manufacturer designed many different ports. For example, the PS2 port is applied for connecting a keyboard, a mouse, and so on; the COM, the RS-232 serial port or the parallel port is applied for connecting a printer. However, these ports are usually incompatible with each other so that a user often feels troublesome to buy the compatible peripheral apparatus or needs to purchase a switch device.

In view of this, the universal serial bus (USB) was developed to enable all peripheral apparatuses to communicate with the data processing equipment via the unified interface. Therefore, the USB port at present is mostly regarded as the standard connection interfaces for the peripheral apparatus as well as the data processing equipment in the market. Due to this advantage, users no longer have the fore-mentioned problems.

However, since the majority of peripheral apparatuses are connected to the data processing equipment by USB ports, it is unavoidable that the quantity of the USB ports of the data processing equipment is insufficient. Therefore, users usually need to carry on the expansion by using USB hubs.

In addition, it is possible for the communication between the data processing equipment via USB ports. Namely, because of the sufficient quantity of the USB ports, users may connect a plurality of the data processing equipment as well as a plurality of the peripheral apparatuses to achieve the purpose of resource sharing.

SUMMARY OF THE INVENTION

Accordingly, an aspect of the present invention is to provide a switching apparatus comprising a plurality of USB hubs and a controller to achieve the fore-mentioned purpose of resource sharing. Besides, the switching apparatus of the invention may also switch the connection relationship of the data processing equipment and the peripheral apparatuses. As a result, the switching apparatus of the invention enables users to control the data processing equipment more flexibly and to save the quantity of peripheral apparatuses.

According to an embodiment of the invention, the switching apparatus is used for controlling M peripheral apparatus to communicate with N image input apparatus; both M and N are positive integers. The switching apparatus comprises O first USB hubs, P second USB hubs and a controller.

The O first USB hubs comprise at least a first port for connecting with the N image input apparatus respectively, while the P second USB hubs comprise at least a second port for connecting with the M peripheral apparatus respectively; both M and N are positive integers.

The controller is connected to at least one of the O first USB hubs and at least one of the P second USB hubs. And, it selects at least one target image input apparatus from the N image input apparatus and controls the at least one target image input apparatus to communicate with at least one target peripheral apparatus of the M peripheral apparatus. For example, the controller controls the at least one image input apparatus to control or to be controlled by the at least one target peripheral apparatus.

Another aspect of the present invention is to provide a display system comprising the aforementioned switching apparatus. A user may apply the display system of the invention connecting with the image input apparatus and the peripheral apparatus to set up a multi-media video and music center.

According to an embodiment of the invention, the display system further comprises a display apparatus, a processor and N image ports. Herein, the N image ports is connected to one of the N image input apparatuses respectively; the processor is connected to the display apparatus, the first controller and the N image ports, for receiving an image data stream provided by each image input apparatus respectively and showing the N image data stream on the display apparatus selectively. In the practical application, the display apparatus may be but not restricted to a monitor, a television or a projector, etc.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

The aspect of the present invention is to provide a switching apparatus and a display system comprising the same. In practice, the display system of the invention comprises a display apparatus such as a monitor, a television, a projector, a large-scale public monitor and so on or other suitable display apparatus. The following will describe a preferable embodiment of the invention in detail, so as to illustrate the characteristic, the essence, the advantage and the practical simplification of the invention.

Figure 1:
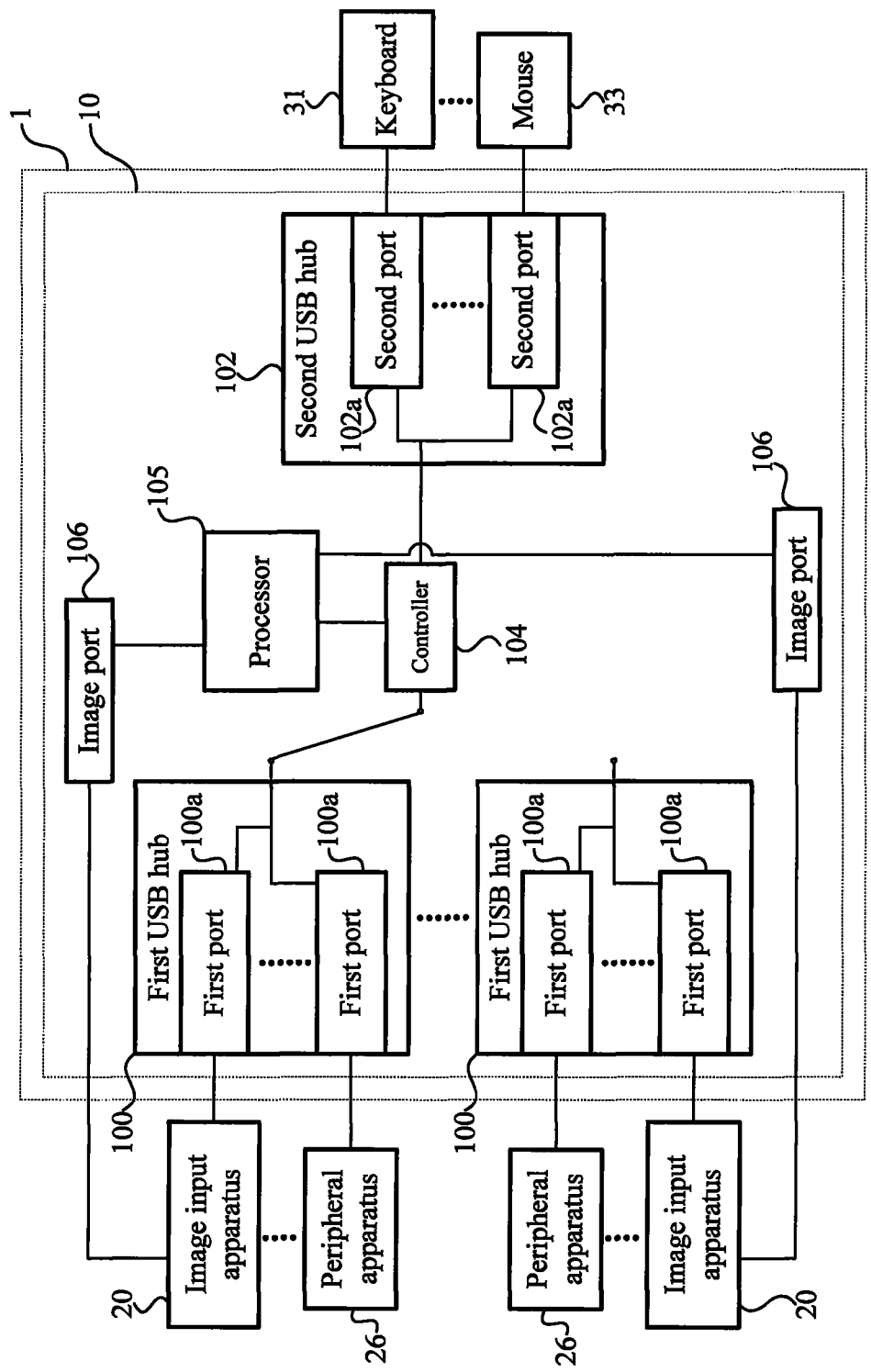
FIG. 1 is a functional block diagram illustrating the switching apparatus according to an embodiment of the invention.

Please refer to FIG. 1 which is a functional block diagram illustrating the display system according to an embodiment of the invention. As shown in the diagram, the display system 1 of the invention comprises a switching apparatus 10, wherein the switching apparatus 10 comprises a certain number of first USB hubs 100, second USB hubs 102, a controller 104 and a processor 105. The switching apparatus 10 comprises O first USB hubs for connecting with N image input apparatus 20. Each of the first USB hubs 100 comprises a plurality of first ports 100a for connecting with the image input apparatus 20 and the peripheral apparatus 26 respectively, wherein both O and N are positive integers but are not limited to 1, 2, 3, 4, 5, 10, and even more. In the embodiment, each of the first USB hubs 100 only connects with an image input apparatus 20, and other first ports are connected with the peripheral apparatus respectively. Therefore, the value of O is equal to N. However, in practice, each of the first USB hubs 100 may connect with one or multiple image input apparatus 20. The image input apparatus 20 may be a computer, a CD/DVD player or other suitable apparatuses.

The second USB hubs 102 comprise a plurality of the second ports 102a for connecting with the peripheral apparatus such as a keyboard 31, a mouse 33, and so on. In practice, each of the second USB hubs 102 may connect with M peripheral apparatus; M is also a positive integer but is not limited to 1, 2, 3, 4, 5, 10, and even more. In practice, in addition to the mentioned keyboard 31 and mouse 33, the peripheral apparatus may also be a monitor, a plotting board or other suitable apparatuses. Moreover, the controller 104 connects with the first USB hubs 100 and the second USB hubs 102 respectively, and selects one of the first USB hubs 100 for connecting with the second USB hubs 102 via its connecting one or a plurality of the image input apparatus 20.

In addition to the image input apparatus 20 or the said peripheral apparatus, the first USB hubs 100 and the second USB hubs 102 may also connect with other peripheral apparatus or other data processing equipments. For example, the first ports 100a of the first hubs 100 and the second ports 102a of the second hubs 102 may connect with the input apparatus such as a keyboard, a mouse, and so on or the storage apparatus such as a hard disk, a CD-ROM drive, a flash drive and so on or the peripheral apparatus such as a multi-media player. Namely, the first USB hubs 100 may connect with an image input apparatus 20 and a mouse or a keyboard at the same time, while the second USB hubs 102 connect with a hard disk.

The processor 105 connects with the controller 104 and the image input apparatus 20 respectively via the image ports 106 to receive an image data stream provided by each of the image input apparatus 20 respectively. In practice, the image ports 106 may be such as Video Graphics Array (VGA) ports, Component Video Connector (CVC) ports, Digital Visual Interface (DVI) ports, High-Definition Multimedia Interface (HDMI) ports or other suitable ports.

In addition, the controller 104 selects one of the first USB hubs 100 and controls the image input apparatus 20 connected with the selecting first USB hub 100 to communicate with at least one target peripheral apparatus of the M peripheral apparatus 30. For example, the controller controls the image input apparatus to save the at least one target peripheral apparatus or controls the image input apparatus to be controlled by the at least one target peripheral apparatus. Certainly, other suitable communication methods are also included in the aspect of the present invention.

In practice, the processor, according to the image data stream, generates and delivers a control signal to the controller; then the controller is driven to select the at least one target image input apparatus. For example, the processor, according to the image area represented by the N image data stream, determines the priority of the N image input apparatus, and generates and delivers the control signal to the controller according to the priority. Namely, when the first image input apparatus providing an image data stream with a bigger image area and the second image input apparatus providing an image data stream with a smaller image area connect with different one of the first USB hubs simultaneously, the processor will determine that the priority of the first image input apparatus is higher according to the image area size and add the priority into the control signal to drive the controller to select the first image input apparatus as the target image input apparatus, i.e. to drive the controller to connect with the first USB hub of the first image input apparatus and to control itself to communicate with the target peripheral apparatus.

For example, the switching apparatus comprises a plurality of the second USB hubs for connecting peripheral apparatus respectively. Via the controller, the first image input apparatus and the second image input apparatus may connect with the peripheral apparatus connected with the second USB hubs. When the first image input apparatus and the second image input apparatus providing the image area represented by the N image data stream are equal, the processor determines the priority of the two image input apparatus to be equal, and generates the control signal to drive the controller to control the first image input apparatus to communicate with one of the peripheral apparatus, and to control the second image input apparatus to communicate with another one of the peripheral apparatus.

Please pay attention that, in practice, the switching apparatus of the invention may also comprises only a first USB hub and a plurality of second USB hubs. The controller may control the first USB hub to connect with one of the second USB hubs selectively.

Figure 2:
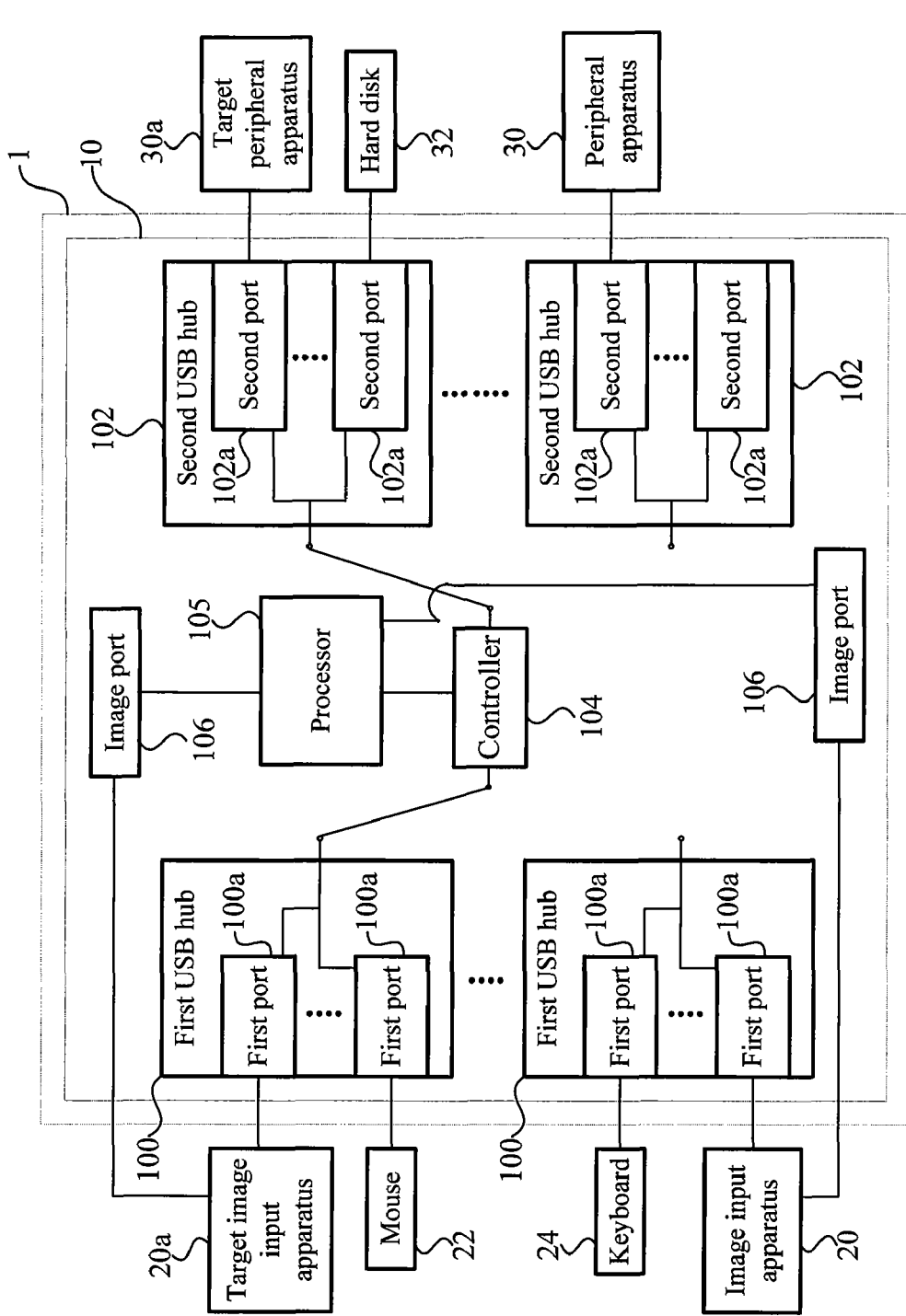
FIG. 2 is a functional block diagram illustrating the switching apparatus according to an embodiment of the invention.

Please further refer to FIG. 2, which is a functional block diagram illustrating the display system 1 according to another embodiment of the invention. As shown in the diagram, in the embodiment, the switching apparatus 10 in the display system 1 of the invention comprises a plurality of first USB hubs 100 and a plurality of second USB hubs 102. The controller 104 of the switching apparatus 10 selectively connects with one of the first USB hubs 100 and one of the second USB hubs 102 respectively via a switch form. Hereby the controller 104 may control the image input apparatus 20 (i.e. the target image input apparatus 20a) connecting with the connected first USB hub 100 to communicate with the peripheral apparatus 30 (i.e. the target peripheral apparatus 30a) connecting with the connected second USB hub 102.

In addition, as shown in FIG. 2, the first ports 100a of the first USB hubs 100 may connect with the control apparatus such as a mouse 22, a keyboard 24, and so on, to control the target image input apparatus 20a and the image input apparatus 20 respectively. Moreover, the second ports 102a of the second USB hubs 102 may connect with the storage apparatus such as a hard disk 32, to provide the target image input apparatus 20a to read and write the data. As shown in the diagram, the controller 104 makes the target image input apparatus 20a connect with the target peripheral apparatus 30a; hereby, the mouse 22 controls the target image input apparatus 20a, the target peripheral apparatus 30a and the hard disk 32. Certainly, in practice, the peripheral apparatus may connect with different first ports 100a or second ports 102a case by case to carry on various different applications.

Figure 3:
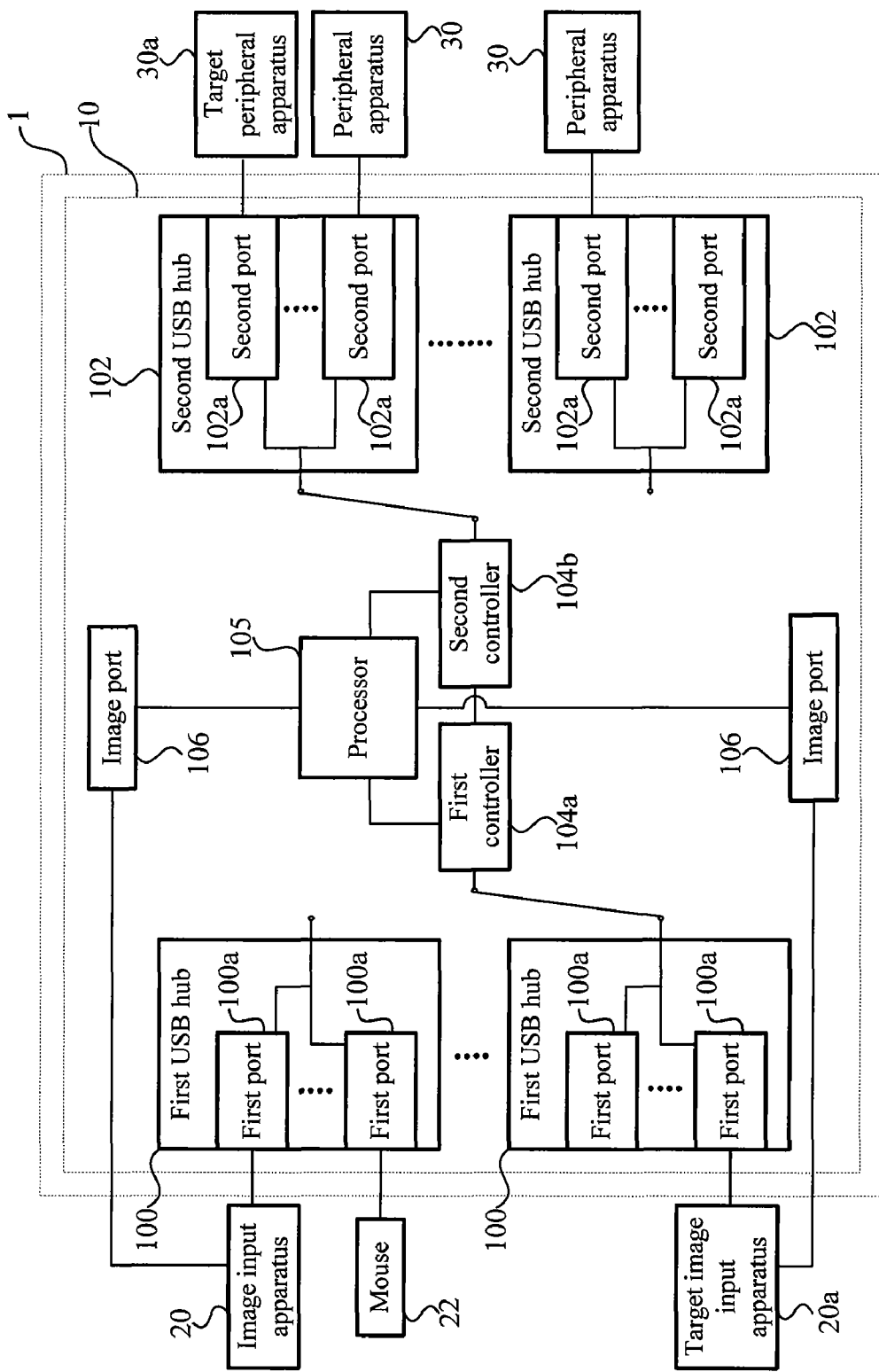
FIG. 3 is a functional block diagram illustrating the switching apparatus according to an embodiment of the invention.

According to an embodiment of the invention, the switching apparatus further comprises a first controller and a second controller. Please refer to FIG. 3, which is a functional block diagram illustrating the display system 1 according to the invention. As shown in the diagram of the embodiment, the first controller 104a selectively connects one of the plurality of the first USB hubs 100 via a switch form and the second controller 104b also selectively connects one of the plurality of the second USB hubs 102 via a switch form; the first controller 104a and the second controller 104b connect with the processor 105 respectively. Please note that in practice, the first controller 104a and/or the second controller 104b may be integrated as a unified device depending on situations or further integrated with the processor 105.

In the embodiment, the processor 105 connects with the image input apparatus 20 via the image ports 106 to receive the image data stream provided by the image input apparatus 20. The processor 105, according to the image data stream, generates a control signal to control the first controller 104a, to drive the first controller 104a to select a target image input apparatus 20a from the image input apparatus 20. Furthermore, the second controller 104b, according to an assignment signal, selects a second USB hub 102 and its connecting peripheral apparatus 30 as the target peripheral apparatus 30a. In practice, the assignment signal can be generated by the processor 105 or be generated by a user via a control interface, and then be delivered to the second controller 104b via a suitable path.

When the first controller 104a receives the control signal from the processor 105, the first controller 104a connects with the target image input apparatus 20a corresponding to the first port 100a. By doing so, a signal channel is established, which makes the target image input apparatus 20a connect with the target peripheral apparatus 30a via the first port 100a, the first controller 104a, the second controller 104b, the second USB hub 102 and the second port 102a to communicate with the target peripheral apparatus 30a.

For example, a computer is connected with the first USB hub and a first mouse and a second mouse are connected with the second hubs respectively. When a user wants to control the computer by the first mouse, s/he may deliver an assignment signal to the second controller to drive the second controller to connect with the first mouse to achieve the fore-mentioned goal. Or, the user may also drive the second controller to connect with the first mouse and the second mouse simultaneously, to control the computer by the two mice at the same time. Certainly, the computer and the mice in the example can be replaced by suitable image input apparatuses or peripheral apparatuses; they are not limited to the mentioned example.

Figure 4:
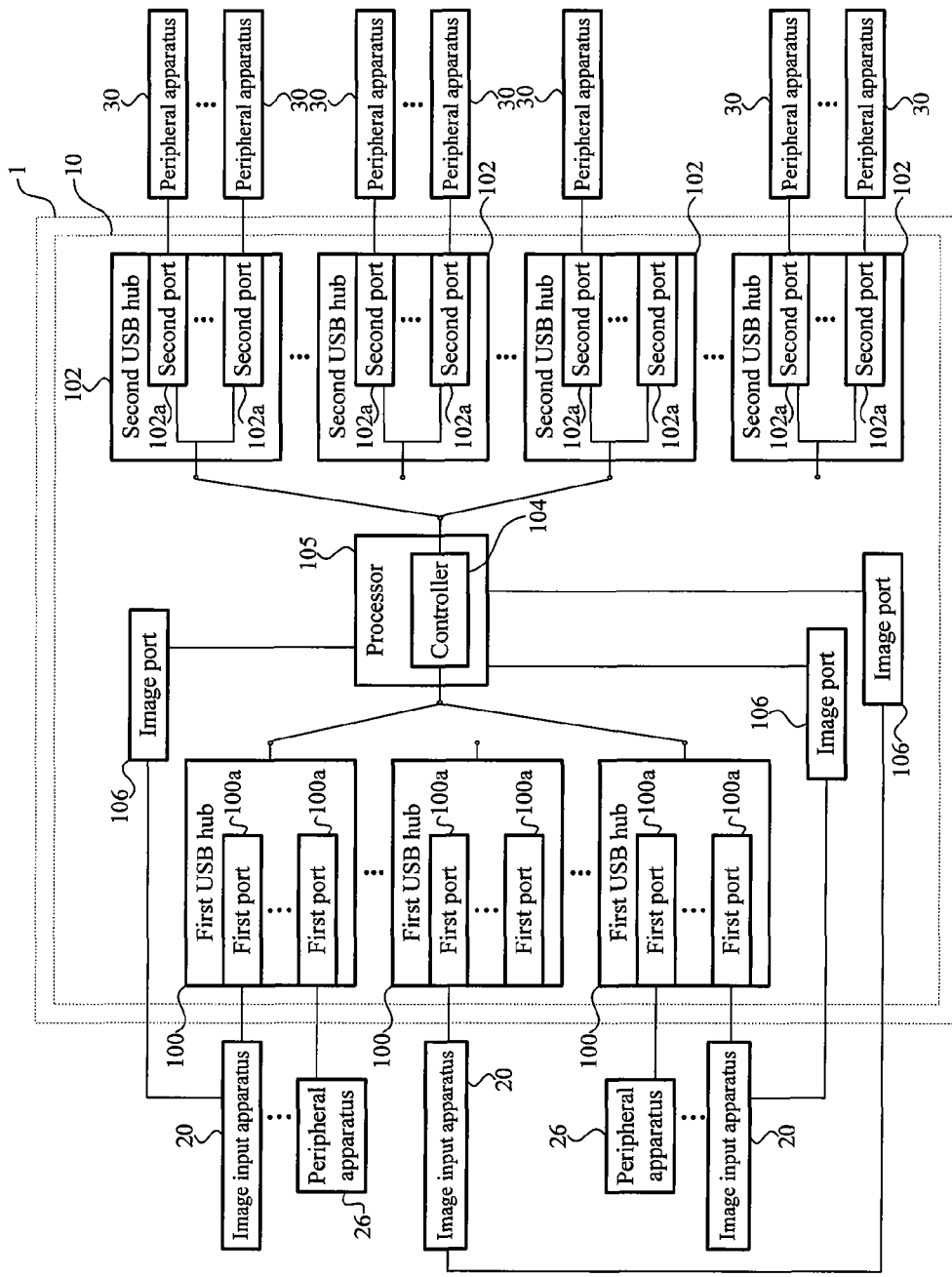
FIG. 4 is a functional block diagram illustrating the display system according to an embodiment of the invention.

Please refer to FIG. 4, which is a functional block diagram illustrating the display system 1 according to an embodiment of the invention. As shown in the diagram, the display system 1 according to the invention comprises said switch apparatus 10. Please note that the comprising devices and their connecting relationships of the switching apparatus 10 are already described in detail in the foregoing and won't be described here again.

The difference from the previous one is that in this embodiment, the processor 105 of the switching apparatus 10 is integrated with the fore-mentioned controller 104. Therefore, the processor 105 may select one or more from a plurality of the first USB hubs 100 as well as one or more from a plurality of the second USB hubs 102. Moreover, the processor 105 may control the image input apparatus 20 connecting with the selected plurality of the first USB hubs 100 to communicate with the peripheral apparatus 30 connecting with the selected second USB hubs 102 independently.

In practice, the display system of the invention may comprise a display apparatus, and the switching apparatus may be set outside of the display apparatus and connect with the display apparatus, or may be set inside of the display apparatus by cases. When the switching apparatus is set in the display apparatus, the said processor may be an image processing device used for processing the image data in normal display apparatus and connect with the controller of the switching apparatus in the invention. Therefore, the processor may selectively show the image data stream on the display apparatus. To sum up, when the display apparatus simultaneously shows the image data stream provided from a plurality of the target image input apparatus and many corresponding pictures are then displayed on the monitor of the display apparatus simultaneously, the switching apparatus of the invention can control a plurality of the peripheral apparatuses to communicate with a plurality of the target image input apparatuses respectively, i.e. each of the peripheral apparatuses selected by the processor may connect a target image input apparatus respectively at the same time via the processor; furthermore, control or operate each of the target image input apparatuses via the peripheral apparatus respectively at the same time.

In practice, the switching apparatus of the invention further comprises an on screen display (OSD) control interface for connecting with the processor or the controller of the switching apparatus, and for a user to select the target image input apparatus and/or the target peripheral apparatus by manual switch. In addition, OSD control interface may also control the display apparatus to only show the image provided by the target input apparatus and hide or shrink the image provided by the non-target image input apparatus.

Figure 5:
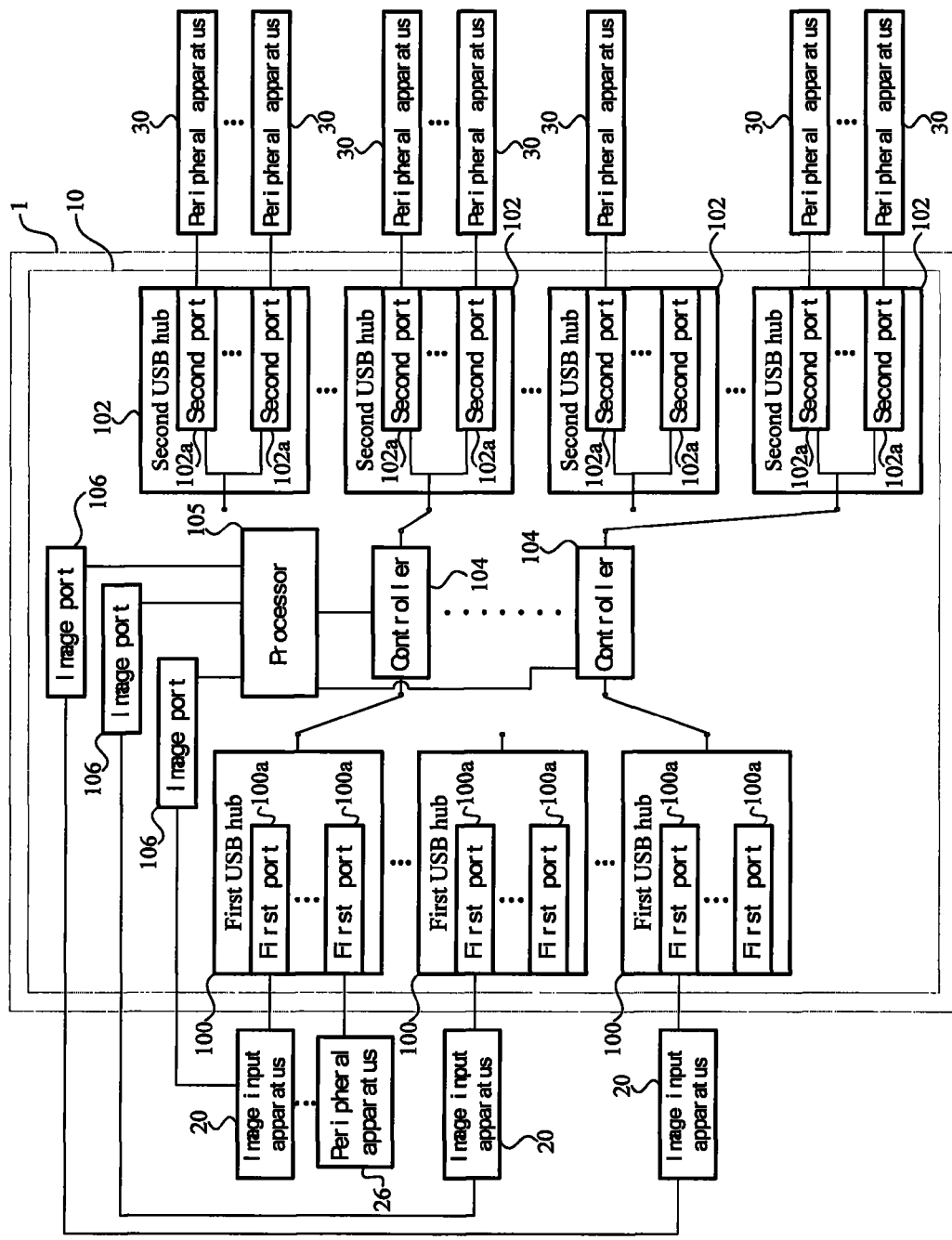
FIG. 5 is a functional block diagram illustrating the display system according to an embodiment of the invention.

Please refer to FIG. 5, which shows a functional block diagram illustrating the display system 1 according to another an embodiment of the invention. As shown in the diagram, the display system 1 according to the invention comprises the said switch apparatus 10. In particular, the switching apparatus 10 of the embodiment comprises a plurality of the controller 104. Each of the controllers 104 connects with one of a plurality of the first USB hubs 100 and one of a plurality of the second USB hubs 102 respectively to make a plurality of the target image input apparatus communicate with a plurality of the peripheral apparatus respectively. In practice, the display system 1 shown in FIG. 5 may also comprise the said display apparatus and the display apparatus may show the image provide from a plurality of the image input apparatus at the same time. It is certain that the controller 104 of the embodiment may also comprise the function of the processor 105 or the controller 104 shown in FIG. 4, i.e. a controller 104 may select two and above the first USB hubs 100 or two and above the second USB hubs 102 simultaneously to control a plurality of the image input apparatus 20 to communicate with the a plurality of the peripheral apparatus 30.

As mentioned above, the processor, according to the image area represented by the N image data stream, determines the priority of the N image input apparatus, and generates and delivers the control signal to the controller according to the priority to drive the controller to select the target image input apparatus. For example, the priority of the image input apparatus with bigger image area is higher; or when a plurality of the image input apparatus provide an equal image area, all of the image input apparatus are selected as the target image input apparatus.

In practice, the processor may, according to a play mode, generate a control signal to drive the controller, according to the control signal, to select the target image input apparatus. For example, when the play mode is a picture-in-picture (PIP)

mode or a picture-on-picture (POP) mode, the image data stream inputted by the first image input apparatus of the N image input apparatus is appeared as a primary picture on the display apparatus, and the image data stream inputted by the second image input apparatus of the N image input apparatus is appeared as a secondary picture on the display apparatus. In the meanwhile, the controller, according to a control signal generated by the processor, selects the first image input apparatus as the target image input apparatus.

In practice, the display system of the invention may also comprise the control interface connected with the processor for a user to input an instruction, and the controller may, according to the instruction, select the target image input apparatus. Hereby, the user may freely select the target image input apparatus, use the target image input apparatus to control the target peripheral apparatus, or use the peripheral apparatus to control the target image input apparatus.

Please note that, in practice, the switching apparatus and the display system of the invention may comprise a plurality of the first USB hubs, a plurality of the second USB hubs and a plurality of the processors or the controllers simultaneously to connect more image input apparatuses and more peripheral apparatuses, but are not limited to the examples mentioned above. In addition, it's better for the switching apparatus setting in the display apparatus and the first ports and the second ports setting on the back, the ventral, the side or the surface of the display apparatus. The switching apparatus may also connect with the display apparatus by a way of an external connection box.

According to the detail description of the embodiments of the invention, it is revealed that the switching apparatus and the display apparatus of the invention may achieve the purpose of resource sharing because of comprising a plurality of USB hubs and their corresponding controllers. In addition, the switching apparatus and the display apparatus of the invention may also switch the connection relationships of the image input apparatus and the peripheral apparatus, for a user to control the image input apparatus more nimbly and save the quantity of the peripheral apparatus as well. Moreover, the comprising display apparatus of the display system of the invention may be a monitor, a television, a large-scale public monitor, a projector or other image apparatuses.

Although the present invention has been illustrated and described with reference to the preferred embodiment thereof, it should be understood that it is in no way limited to the details of such embodiment but is capable of numerous modifications within the scope of the appended claims.

What is claimed is:

1. A switching apparatus for controlling M peripheral apparatuses to communicate with N image input apparatuses, both M and N are positive integers, and the switching apparatus comprising:
   O first universal serial bus (USB) hubs, each of the first USB hubs providing at least a first port for connecting with the N image input apparatus respectively, O being a positive integer;
   P second USB hubs comprising at least a second port for connecting with the M peripheral apparatus respectively, P being a positive integer;
   a first controller for connecting at least one of the O first USB hubs and at least one of the P second USB hubs, for selecting at least one target image input apparatus from the N image input apparatus, and for controlling the at least one target image input apparatus to communicate with at least one target peripheral apparatus of the M peripheral apparatus; and
   a second controller connected with at least one of the P second USB hubs and the first controller, the second controller connecting with the at least one target peripheral apparatus via said second USB hub according to an assignment signal, such that the at least one target image input apparatus is capable of communicating with the at least one target peripheral apparatus.

2. The switching apparatus of claim 1, further comprising:
   a processor connected with the first controller, and the processor connected with the N image input apparatus respectively via N image ports to receive an image data stream provided by each the N image input apparatus respectively.

3. The switching apparatus of claim 2, wherein the processor, according to the image data stream, generates and delivers a control signal to the first controller to drive the first controller, according to the control signal, to select the at least one target image input apparatus.

4. The switching apparatus of claim 3, wherein the processor, according to the image area represented by the N image data stream, determines the priority of the N image input apparatus, and generates and delivers the control signal to the first controller according to the priority.

5. The switching apparatus of claim 2, wherein the processor, according to a play mode, generates and delivers the control signal to the first controller to drive the first controller, according to the control signal, to select the at least one target image input apparatus.

6. The switching apparatus of claim 5, wherein the play mode is a picture-in-picture (PIP) play mode; wherein a first image input apparatus of the N image input apparatus inputs the image data stream as a primary picture and a second image input apparatus of the N image input apparatus inputs the image data stream as a secondary picture.

7. The switching apparatus of claim 6, wherein the first controller, according to the control signal, selects the first image input apparatus as the target image input apparatus.

8. The switching apparatus of claim 2, wherein the switching apparatus is set in a display apparatus, the processor is an image processing device of the display apparatus, and the processor selectively shows the N image data stream on the display apparatus.

9. The switching apparatus of claim 8, wherein the display apparatus is a monitor, a television, a large-scale public monitor or a projector.

10. The switching apparatus of claim 2, wherein the switching apparatus is connected with a display apparatus and the processor selectively shows the N image data stream on the display apparatus.

11. The switching apparatus of claim 2, wherein the second controller is connected with the processor and at least one of the O first USB hubs, for selecting at least one target image input apparatus from the N image input apparatus, and controlling the at least one target image input apparatus to communicate with at least one target peripheral apparatus of the M peripheral apparatuses.

12. The switching apparatus of claim 1, wherein the first controller is further connected with a control interface for a user to input an instruction, and the first controller, according to the instruction, selects the at least one target image input apparatus.

13. The switching apparatus of claim 1, wherein the first controller is connected with a plurality of the first USB hubs and a plurality of the second USB hubs, such that each of the first USB hubs is capable of communicating with one of the second USB hubs respectively.

14. A display system comprising:
a display apparatus;
O first universal serial bus (USB) hubs, each of the first USB hubs providing at least a first port for connecting with N image input apparatuses respectively, both O and N being positive integers;
P second USB hubs comprising at least a second port for connecting with M peripheral apparatuses respectively, both P and M being positive integers;
a first controller for connecting at least one of the O first USB hubs and at least one of the P second USB hubs, for selecting at least one target image input apparatus from the N image input apparatuses, and for controlling the at least one target image input apparatus to communicate with at least one target peripheral apparatus of the M peripheral apparatus;
N image ports connected with one of the N image input apparatuses respectively;
a processor for connecting the display apparatus, the first controller and the N image ports, for receiving an image data stream provided by each image input apparatus respectively and showing the N image data stream on the display apparatus selectively; and
a second controller connected with the processor, at least one of the O first USB hubs and at least one of the P second USB hubs, for selecting at least one target image input apparatus from the N image input apparatus, and controlling the at least one target image input apparatus to communicate with at least one target peripheral apparatus of the M peripheral apparatuses.

15. The display system of claim 14, wherein the processor, according to the image data stream, generates and delivers a control signal to the first controller to drive the first controller, according to the control signal, to select the at least one target image input apparatus.

16. The display system of claim 15, wherein the processor, according to the image area represented by the N image data stream, determines the priority of the N image input apparatus, and generates and delivers the control signal to the first controller according to the priority.

17. The display system of claim 15, wherein the processor, according to a play mode, generates and delivers the control signal to the first controller to drive the first controller, according to the control signal, to select the at least one target image input apparatus.

18. The display system of claim 17, wherein the play mode is a picture-in-picture (PIP) play mode; wherein a first image input apparatus of the N image input apparatus inputs the image data stream as a primary picture and a second image input apparatus of the N image input apparatus inputs the image data stream as a secondary picture.

19. The display system of claim 18, wherein the first controller, according to the control signal, selects the first image input apparatus as the target image input apparatus.

20. The display system of claim 14, wherein the O first USB hubs, the P second USB hubs, the first controller, the N image ports and the processor are set in the display apparatus, the processor is an image processing device of the display apparatus.

21. The display system of claim 14, further comprising:
a control interface connected with the first controller for a user to input an instruction; wherein the first controller, according to the instruction, selects the at least one target image input apparatus.

22. The display system of claim 21, wherein the control interface comprising an on screen display (OSD) control interface.

23. The display system of claim 14, wherein the second controller is connected with the first controller, and the second controller connects with the at least one target peripheral apparatus via said second USB hub according to an assignment signal, such that the at least one target image input apparatus is capable of communicating with the at least one target peripheral apparatus.

24. The display system of claim 14, wherein the first controller is connected with a plurality of the first USB hubs and a plurality of the second USB hubs, such that each of the first USB hubs is capable of communicating with one of the second USB hubs respectively.

25. The display system of claim 14, wherein the display apparatus is a monitor, a television, a large-scale public monitor or a projector.

26. The display system of claim 14, wherein the peripheral apparatus is a mouse, a keyboard or a storage apparatus.

* * * * *